(12) United States Patent
Cumming

(10) Patent No.: US 12,316,198 B2
(45) Date of Patent: *May 27, 2025

(54) SYSTEMS AND METHODS FOR PRODUCING CLEAN ENERGY

(71) Applicant: James Stuart Cumming, Laguna Beach, CA (US)

(72) Inventor: James Stuart Cumming, Laguna Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/815,663

(22) Filed: Aug. 26, 2024

(65) Prior Publication Data
US 2025/0070616 A1    Feb. 27, 2025

Related U.S. Application Data

(63) Continuation-in-part of application No. 18/654,996, filed on May 3, 2024, now Pat. No. 12,209,566, which is a continuation-in-part of application No. 18/544,103, filed on Dec. 18, 2023, now abandoned.

(60) Provisional application No. 63/592,558, filed on Oct. 23, 2023, provisional application No. 63/534,557, filed on Aug. 24, 2023.

(51) Int. Cl.
| | |
|---|---|
| *H02K 7/18* | (2006.01) |
| *F03B 13/10* | (2006.01) |
| *F03B 17/02* | (2006.01) |
| *F03B 17/04* | (2006.01) |
| *F03B 17/06* | (2006.01) |

(52) U.S. Cl.
CPC ........... *H02K 7/1823* (2013.01); *F03B 13/10* (2013.01); *F03B 17/025* (2013.01); *F03B 17/04* (2013.01); *F03B 17/06* (2013.01); *F05B 2220/706* (2013.01)

(58) Field of Classification Search
CPC ..... H02K 7/1823; F03B 13/10; F03B 17/025; F03B 17/04; F03B 17/06; F05B 2220/706
USPC ..................... 415/916; 60/495–496
See application file for complete search history.

(56) References Cited

U.S. PATENT DOCUMENTS

| | | |
|---|---|---|
| 2,470,312 A | 5/1949 | Levin |
| 4,739,182 A | 4/1988 | Kenderi |
| (Continued) | | |

OTHER PUBLICATIONS

International Search Report and Written Opinion for PCT/US2024/043922 dated Nov. 1, 2024 (pp. 1-22).

*Primary Examiner* — Hoang M Nguyen
(74) *Attorney, Agent, or Firm* — Sheppard, Mullin, Richter & Hampton LLP

(57) ABSTRACT

A system for generating electricity from a body of water that comprises an enclosure having a first upper aperture, a second upper aperture, and a closable lower outlet. The system furthers comprises a buoyant container movable within the enclosure between an upper position and a lower position. The container has an upper end that is at least partially open and a lower end having a closable drain. The system further comprises a set of upper supports coupled to the enclosure and configured to support the container in the upper position, and a set of lower supports fixed to the lower end of the enclosure to allow water to partially surround the buoyant container and help it float up to the upper position. The system comprises a cable, rod, or other connection member coupled at one end to the container and configured to extend through the enclosure for connection to an electrical generator.

20 Claims, 14 Drawing Sheets

(56) References Cited

U.S. PATENT DOCUMENTS

| | | | |
|---|---|---|---|
| 6,768,216 B1* | 7/2004 | Carroll | F03B 13/148 |
| | | | 290/43 |
| 8,024,927 B1 | 9/2011 | Azizi | |
| 2005/0079015 A1 | 4/2005 | Beaston | |
| 2010/0024413 A1* | 2/2010 | Kim | F03B 17/02 |
| | | | 60/496 |
| 2010/0237630 A1* | 9/2010 | Rangel | F03B 17/00 |
| | | | 290/1 R |
| 2011/0012369 A1* | 1/2011 | Grossman | H02K 53/00 |
| | | | 290/1 R |
| 2011/0126538 A1 | 6/2011 | Kim | |

* cited by examiner

SYSTEMS AND METHODS FOR PRODUCING CLEAN ENERGY

CROSS-REFERENCE TO RELATED APPLICATIONS

This application is a continuation-in-part of U.S. patent application Ser. No. 18/654,996, filed on May 3, 2024, which claims priority to U.S. patent application Ser. No. 18/544,103, filed on Dec. 18, 2023 which claims priority to U.S. Provisional Patent Application No. 63/534,557, filed on Aug. 24, 2023 and U.S. Provisional Patent Application No. 63/592,558, filed on Oct. 23, 2023, which are hereby incorporated by reference as if fully set forth herein This application is also a continuation-in-part of U.S. patent application Ser. No. 18/544,103, filed on Dec. 18, 2023 which claims priority to U.S. Provisional Patent Application No. 63/534,557, filed on Aug. 24, 2023 and U.S. Provisional Patent Application No. 63/592,558, filed on Oct. 23, 2023, which are hereby incorporated by reference as if fully set forth herein.

TECHNICAL FIELD

The present application relates generally to systems and methods for producing clean energy, and more particularly, some embodiments relate to a system comprising a buoyant container designed to hold a volume of water and produce energy therefrom.

DESCRIPTION OF THE RELATED ART

Current methods of harnessing the power of water for electricity generation are mainly based on the movement of devices by tides to produce energy, or involve hydroelectric schemes requiring the existence of a deep reservoir where water is released to drive turbines in the walls of dams. Unfortunately, tide-based methods have not been well accepted or put into practice, and additionally are difficult to manufacture and maintain in the ocean. While dam-based hydroelectric methods are well established and account for a significant percentage of energy generation in certain places in the world, these methods require a deep water reservoir and can harm the local environment.

Meanwhile, global warming and human-induced climate change have greatly reduced the acceptance of more traditional means of producing energy, particularly the burning of fossil fuels such as coal, which in many areas of the world is still the major source of energy generation.

The major advances in clean-energy generation now widely used in the world use either the wind or the sun, neither of which is constantly available. Additionally, wind and solar-based electricity generation schemes have to be located in carefully selected areas, which are unavailable in many areas of the world. Such schemes are also an eyesore in many locations.

Nuclear energy is another potential source of energy not based on the burning of fossil fuels, of it is an unpopular method that has already led to several disasters.

Current methods of generating electricity thus involve a multitude of problems. Embodiments of the present invention solve one or more of these problems and provide further related advantages.

BRIEF SUMMARY OF EMBODIMENTS

According to various embodiments of the disclosed technology, there is disclosed herein an electricity-generating device having a structure that relies on the consistent availability of moving water from rivers, waterfalls, reservoirs, or other bodies of flowing water, or from tidal action. In various embodiments, the functioning of the device depends on there being a significant drop-off in the water level from where water is collected by the device to where the water is discarded.

In one embodiment, in the case of a waterfall, water discharge can be close to the waterfall if there is a significant drop-off in the water level from the top of the waterfall to the bottom. In another embodiment, if the drop-off is not significant, the water can be discharged to a lower location by underground pipes, or by pipes running through or along the bed of the body of water.

In one embodiment, the electricity-generating device is located in a body of flowing water close to a high-density inhabited or industrial area. In another embodiment, the electricity-generating device is located in a body of flowing water in a rural area and connected to the electrical grid by means of transmission wires.

In one embodiment, the electricity-generating device is operatively connected to a generator. The generator may be camouflaged by means of outer materials or coloration to blend in with the environmental surroundings. In another embodiment, the generator is concealed by being submerged in a pit.

In one embodiment, the electricity-generating device is located in a river close to a high waterfall, such as Niagara Falls. In a particular embodiment, the electricity-generating device is located near a waterfall having a height of 20 feet or more. In another embodiment, the electricity-generating device in located in a river or other body of flowing water having a gentle gradient.

According to a particular embodiment of the disclosed technology, there is disclosed herein a system for generating electricity from a body of water. The system may comprise an enclosure positioned in or under a first portion of the body of water and having a first upper aperture, a second upper aperture, and a closable lower outlet connected via a pipe to air and/or to a second portion of the body of water downstream from the first portion of the body of water, the second portion having a surface elevation lower than an elevation of the closable lower outlet of the enclosure. The system may further comprise a buoyant container movable within the enclosure between an upper position and a lower position. The container may have an upper end that is at least partially open and a lower end having a closable drain. The system may further comprise a set of upper supports coupled to the enclosure and configured to support the container in the upper position. The system may further comprise a cable, rod, or other connection member coupled at one end to the container and configured to extend through the enclosure for operative connection to an electrical generator, either directly or via one or more intermediate components.

In one embodiment, the enclosure comprises an upper wall in which the first upper aperture and the second upper aperture of the enclosure are located, at least one sidewall connected to the upper wall, and a lower wall in which the lower outlet of the enclosure is located, the lower wall being connected to the sidewall. The first upper aperture of the enclosure may be located above the container in a central portion of the upper wall. The second upper aperture of the enclosure may be located in a peripheral portion of the upper wall. The system may further comprise a vertical shaft extending downwardly within the enclosure from the second upper aperture of the enclosure toward the lower wall. The lower wall of the enclosure may be sloped downwardly toward the lower outlet of the enclosure to reduce sediment build-up within the enclosure.

In one embodiment, the container comprises a lower wall in which the drain of the container is located and a sidewall connected to the lower wall. The lower wall of the container may be sloped downwardly toward the drain of the container to reduce sediment build-up within the container. The drain of the container may be vertically aligned with the lower outlet of the enclosure and be located in a central portion of the lower wall of the container. In a particular embodiment, the drain protrudes from the lower wall of the container and is shaped to fit at least partially within the lower outlet of the enclosure. The drain may be have a frustum or other suitable shape.

In one embodiment, the set of upper supports is retractable or pivotable so as to release the container from the upper position.

In one embodiment, the system further comprises a set of lower supports coupled to the enclosure and configured to support the container in the lower position in order to allow water to partially surround the container and cause the container to float back up to the upper position.

In one embodiment, the connection member is configured to extend through the first upper aperture of the enclosure for connection to the electrical generator.

In one embodiment, the pipe coupled to the lower outlet of the enclosure is configured to drain water away from the enclosure.

In one embodiment, instead of the enclosure having a first upper aperture and a second upper aperture, the enclosure may have a one upper aperture and a valve configured to divert water flowing through the upper aperture either into the container or outside of the container into the enclosure.

In one embodiment, the system further comprises a plug having an inner conduit aligned with the first upper aperture of the enclosure and extending from an upper end of the plug to a lower end of the plug. The upper end of the plug may extend above the body of water to allow air to flow through the inner conduit. The plug is movable from an upper position in which the lower end of the plug is located above the first upper aperture of the enclosure to allow water to flow through the first upper aperture, and a lower position in which the lower end of the plug extends at least partially into the first upper aperture of the enclosure to allow air to flow through the first upper aperture via the inner conduit of the plug. The lower end of the plug may have a frustum or other suitable shape.

In operation, according to a various embodiments of the disclosed technology, when the container is in the upper position within the enclosure and the enclosure is substantially empty of water, the drain of the container is closed and the first upper aperture of the enclosure allows water to flow from the body of water into the container. When the container is at least partially filled with water in the upper position, the set of upper supports releases the container from the upper position so that the container may descend from the upper position to the lower position within the enclosure. When the container is in the lower position within the enclosure, the drain of the container may be opened to allow water to flow out of the container and through the lower outlet of the enclosure. After the container is at least partially emptied of water in the lower position, the second upper aperture of the enclosure allows water to flow from the body of water into the enclosure outside of the container, causing the container to ascend from the lower position to the upper position.

In one embodiment, when the container descends from the upper position to the lower position within the enclosure, water stops flowing through the first upper aperture from the body of water into the container.

In one embodiment, when the container descends from the upper position to the lower position within the enclosure, the container pulls the connection member, causing the electrical generator to generate electricity. Before the container descends, the plug is lowered into place within the first upper aperture of the enclosure so that water does not continue to enter the enclosure and air is instead allowed to enter.

In one embodiment, when the second upper aperture of the enclosure allows water to flow from the body of water into the enclosure, the first upper aperture of the enclosure allows air to escape from the enclosure through the conduit of the plug in the closed position.

In one embodiment, after the container ascends from the lower position to the upper position, the lower outlet of the enclosure opens to allow water in the enclosure to drain out of the enclosure.

Each feature or concept outlined above is independent and can be combined with other features or concepts outlined above or with any other feature or concept disclosed in this application.

According to an embodiment of the disclosed technology, there is also disclosed herein a method for generating electricity from a body of water. The method comprises providing, in or below a first portion of a body of water, an enclosure having a first upper aperture, a second upper aperture, and a closable lower outlet. The closable lower outlet may be connected via a pipe to air. Additionally or alternatively, the method may comprise connecting, via a pipe, the closable lower outlet of the enclosure to a second portion of the body of water downstream from the first portion of the body of water, the second portion having a surface elevation lower than an elevation of the closable lower outlet of the enclosure.

The method may further comprise providing, within the enclosure, a buoyant container movable within the enclosure between an upper position and a lower position, the container having an upper end that is at least partially open and a lower end having a closable drain, the container being operatively coupled to an electrical generator via cable, rod, or other connection member. The method may further comprise supporting the container in the upper position with a set of upper supports coupled to the enclosure while the enclosure is substantially empty of water. The method may further comprise allowing water to flow from the body of water through the first upper aperture into the container when the container is in the upper position within the enclosure and the drain of the container is closed. The method may further comprise releasing the container from the upper position so that the container may descend from the upper position to the lower position within the enclosure when the container is at least partially filled with water in the upper position. The method may further comprise opening the drain of the container to allow water to flow out of the container and through the lower outlet of the enclosure when the container is in the lower position within the enclosure. The method may further comprise allowing water to flow from the body of water through the second upper aperture into the enclosure outside of the container after the container is at least partially emptied of water in the lower position, causing the container to ascend from the lower position to the upper position.

In one embodiment, the method further comprises stopping the flow of water through the first upper aperture from the body of water into the container when the container descends from the upper position to the lower position within the enclosure.

In one embodiment, the method further comprises allowing air to escape from the enclosure through the first upper aperture when the second upper aperture of the enclosure allows water to flow from the body of water into the enclosure.

In one embodiment, the method further comprises allowing water in the enclosure to drain out of the enclosure through the lower outlet of the enclosure after the container ascends from the lower position to the upper position.

Each feature or concept outlined above is independent and can be combined with other features or concepts outlined above or with any other feature or concept disclosed in this application.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that, for clarity and ease of illustration, these drawings are not necessarily made to scale.

The figures are not exhaustive and do not limit the disclosure or the disclosed embodiments to the precise form disclosed.

DETAILED DESCRIPTION OF THE EMBODIMENTS

Embodiments of the technology disclosed herein are directed toward devices and methods for generating electricity from a body of water. More particularly, various embodiments of the technology disclosed herein relate to a system comprising a buoyant container designed to hold a volume of water and produce energy therefrom.

Figure 1:
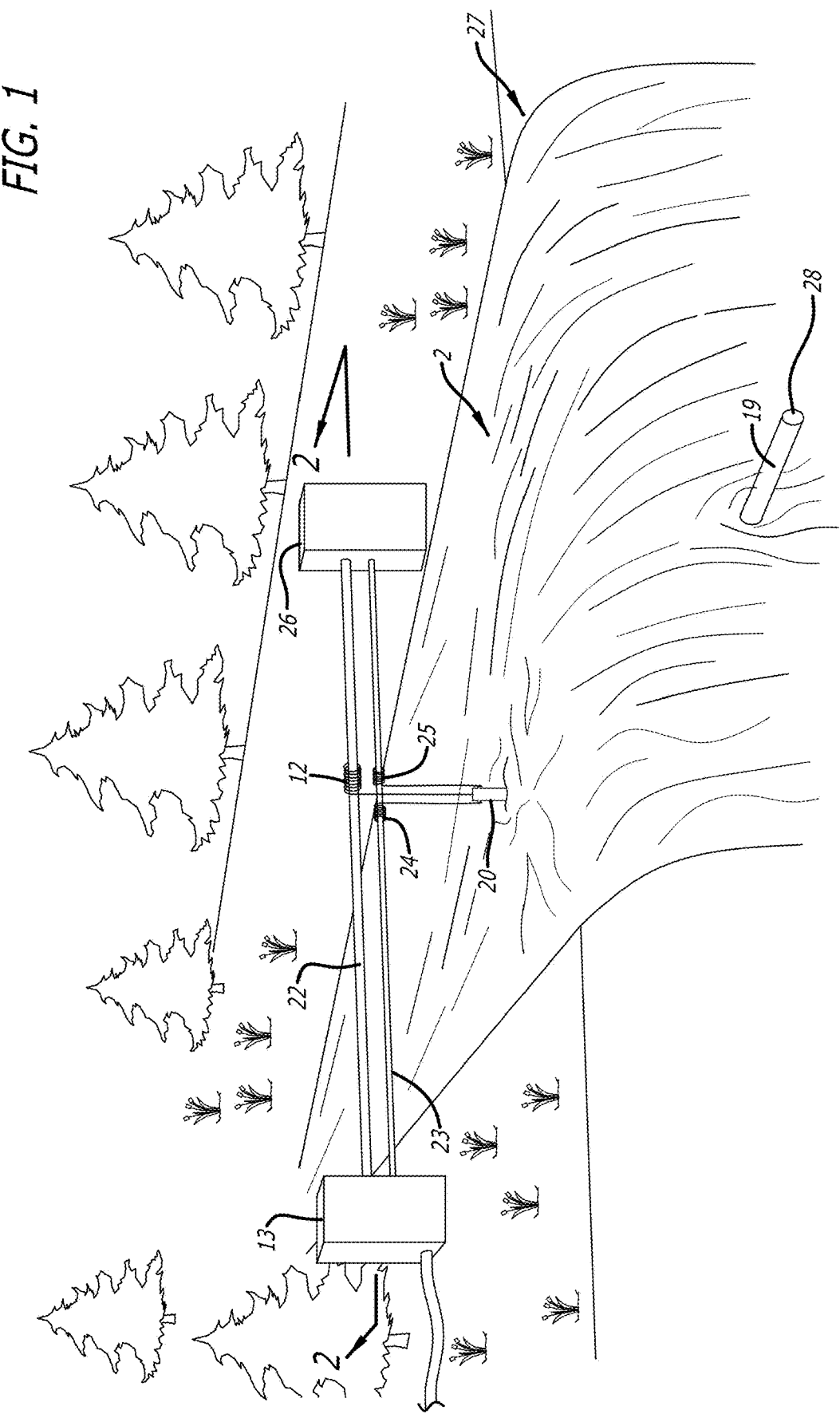
FIG. 1 is a perspective view of a system for generating electricity from a body of water, with portions of the system hidden beneath the surface of the water.
Figure 2:
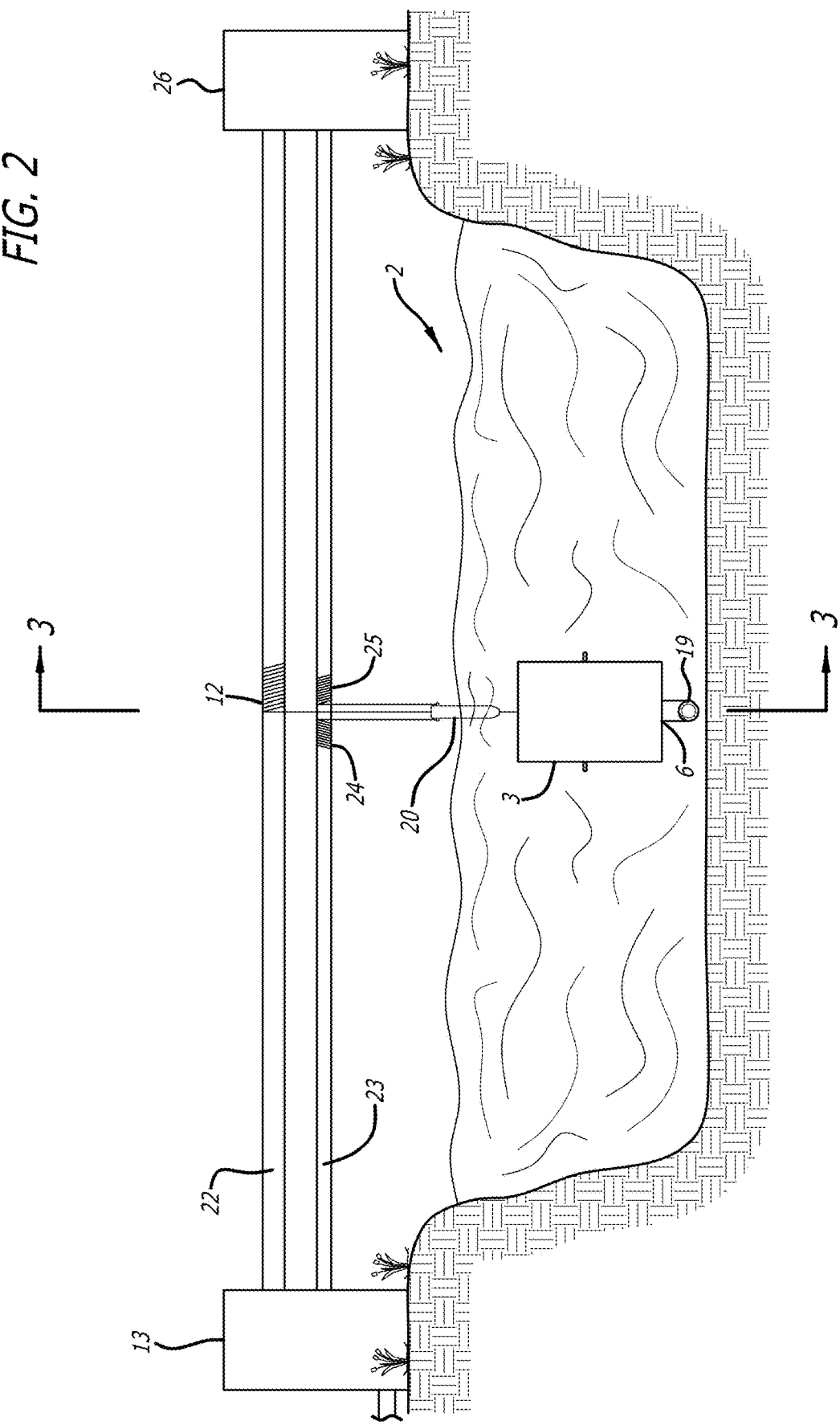
FIG. 2 is a cross-sectional, elevational view of the system of FIG. 1, taken along the line 2-2 in FIG. 1, in accordance with one embodiment of the technology described herein.
Figure 3:
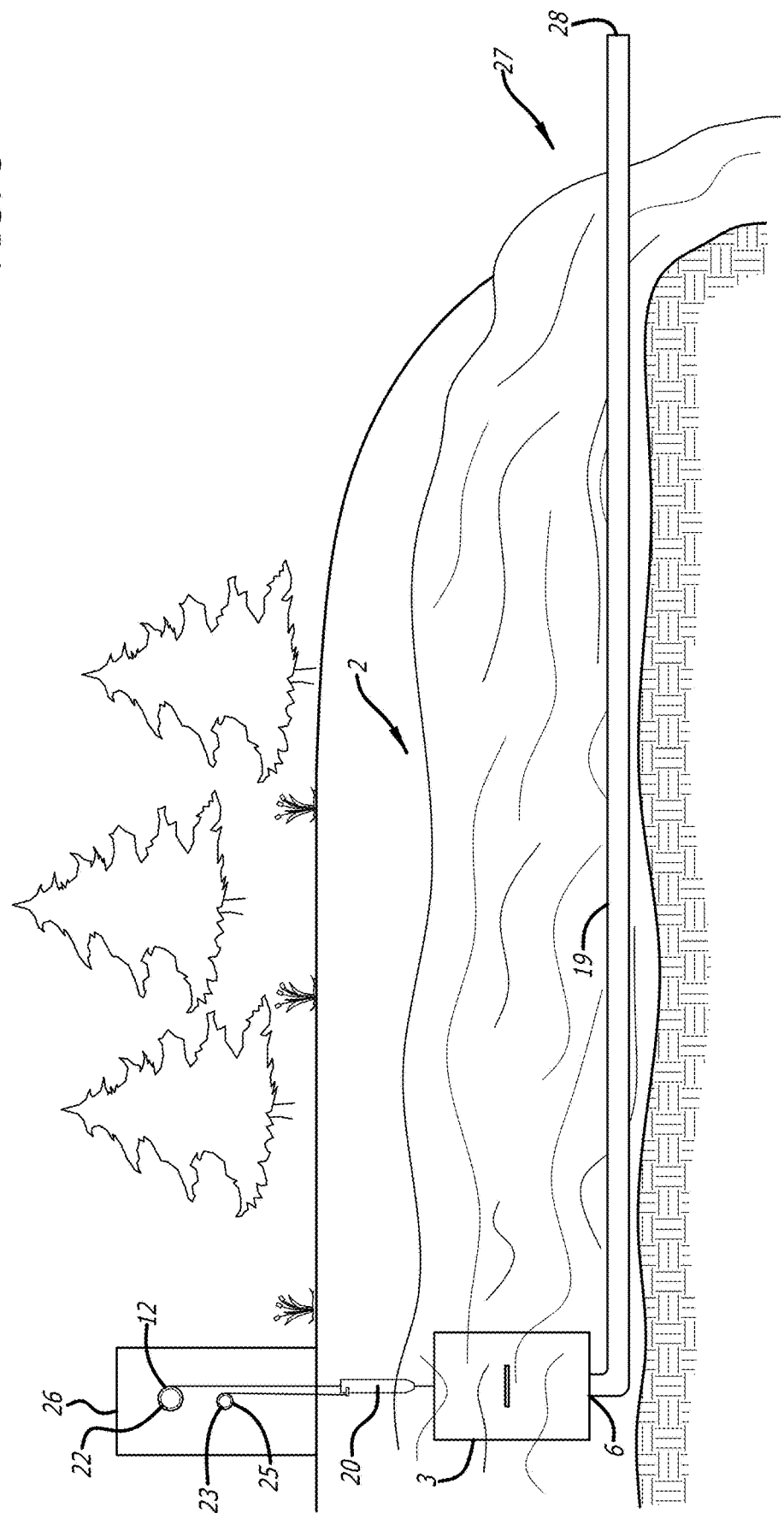
FIG. 3 is a cross-sectional, elevational view of the system of FIG. 1, taken along the line 3-3 in FIG. 2, in accordance with one embodiment of the technology described herein.

With reference to the figures, and in particular to FIGS. 1-5, there is shown a system 1 for generating electricity from a body of water 2, which may be a flowing body of water such as a river or stream, as shown. With particular reference to FIGS. 1-3, the system may be configured in one embodiment to span the full body of water 2, with an electrical generator 13 on one side of the body of water 2. In other embodiments, the system may be configured to span a trench dug along one of the banks of the body of water 2 instead of spanning the full body of water 2.

As shown in FIGS. 1-3, the electrical generator 13 is rotatably attached to a first axle 22, around which a connection member 12 is tightly wound. The electrical generator 13 is also rotatably attached to a second axle 23, around which a first plug cable 24 and a second plug cable 25 are tightly wound. A second electrical generator 26 may be positioned on the other side of the body of water 2, opposite the electrical generator 13, and be rotatably attached to the first axle 22 and the second axle 23. In embodiments where the system spans a trench dug along one of the banks of the body of water 2, the second electrical generator 26 may be positioned on the other side of the trench from the electrical generator 13.

Electrical wires may extend from the electrical generator 13 and/or the electrical generator 26 to take electricity to the electrical grid (not shown). Electricity may be generated by rotation of the first axle 22 about its axis, accomplished by pulling of the connection member 12. The first axle may be biased, such as by a spring inside one or both of the electrical generators, so that when tension on the connection member 12 is released, the first axle reverses its rotation and re-winds the connection member 12. As shown in FIG. 1, the first axle 22 and the second axle 23 extend substantially perpendicular to the flow of water.

Figure 4:
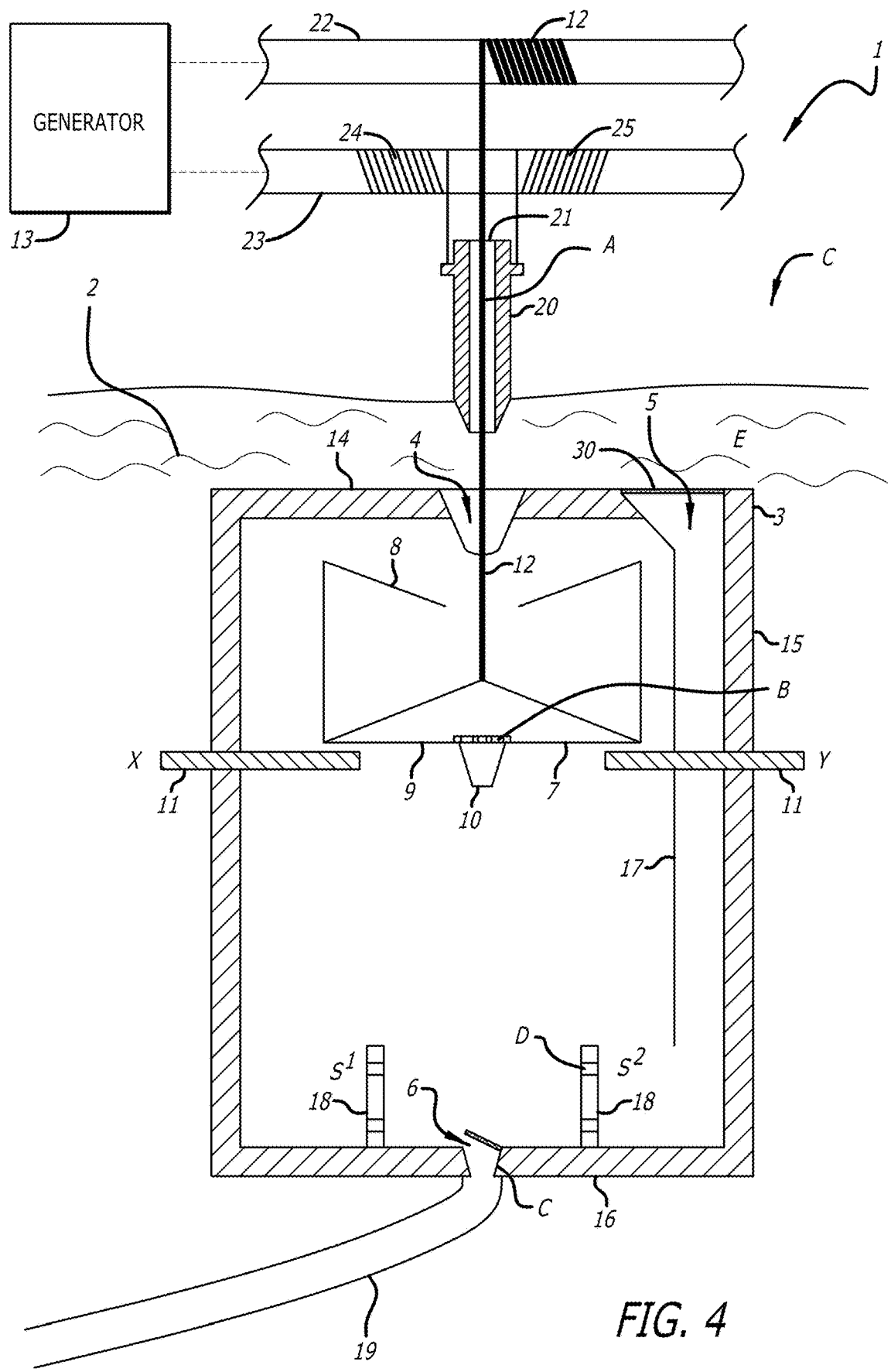
FIG. 4 is a cross-sectional, elevational view of the system of FIG. 1, showing a buoyant container in an upper position of an outer enclosure in accordance with one embodiment of the technology described herein.
Figure 5:
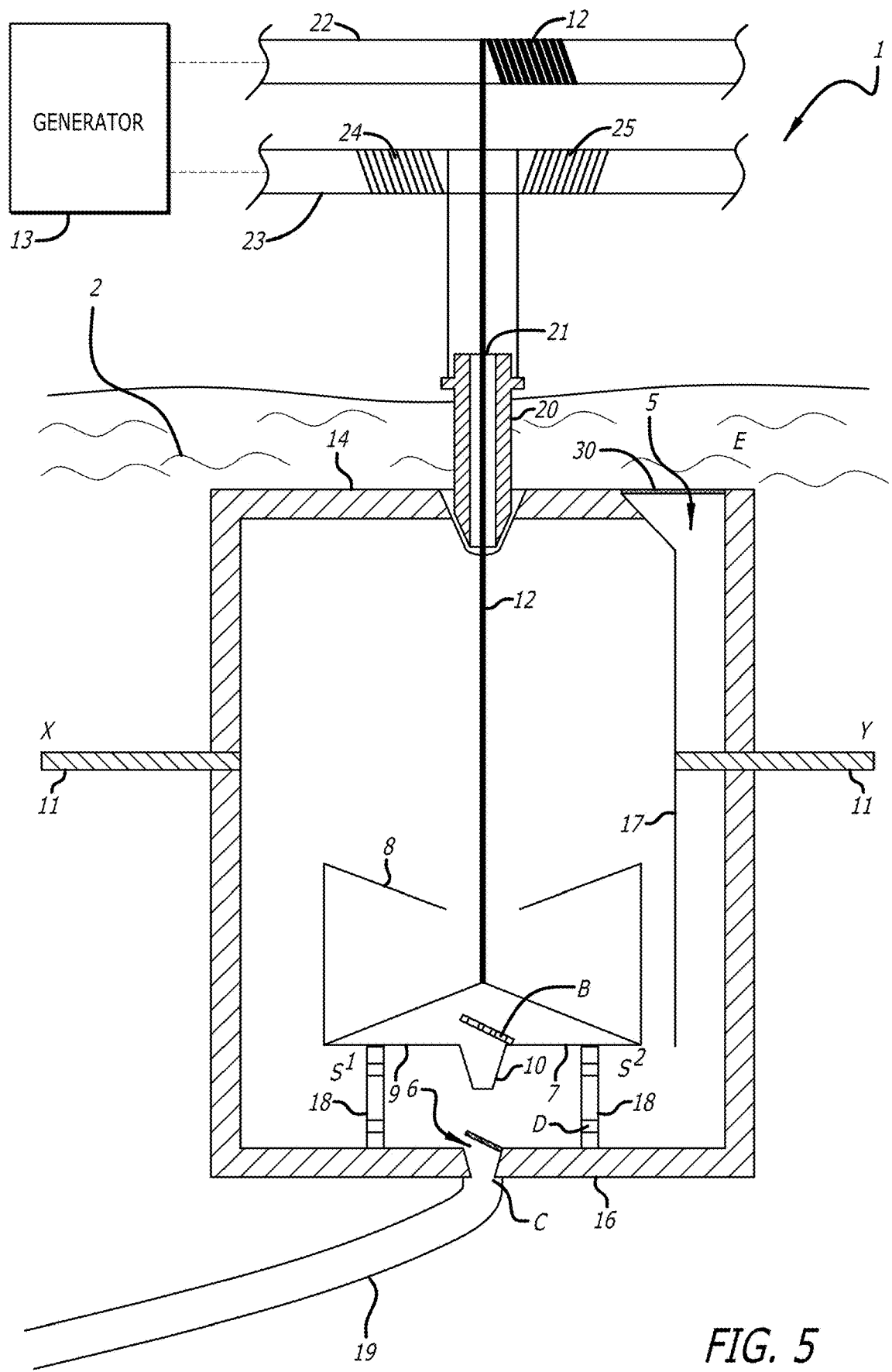
FIG. 5 is a cross-sectional, elevational view of the system of FIG. 1, showing the buoyant container in a lower position of the outer enclosure in accordance with one embodiment of the technology described herein.

Referring now to FIGS. 4 and 5, the system 1 comprises an enclosure 3 having a first upper aperture 4, a second closeable upper aperture 5, and a closable lower outlet 6. The enclosure 3 is completely below the surface of the water and may rest on the bottom of the body of water 2, be placed in a hole dug along the bed of the body of water 2, or be raised off of the bottom of the body of water 2. FIGS. 1 and 2 show a single enclosure 3 positioned approximately halfway across the body of water 2, upstream of a waterfall 27. In other embodiments, multiple enclosures 3 may be positioned in or under the body of water 2 along the first axle 22 and the second axle 23. In yet other embodiments, one or more enclosures 3 may be positioned in or under a portion of the body of water 2 that is upstream of another portion of the body of water at a lower elevation.

The system 1 further comprises a buoyant container 7 movable within the enclosure 3 between an upper position and a lower position. FIG. 4 shows the container 7 in the upper position, while FIG. 5 shows the container 7 in the lower position.

The container 7 has an upper end 8 that is at least partially open and a lower end 9 having a closable drain 10. The lower end 9 may be flat, as shown in FIGS. 4 and 5, or have a floor that slopes downwardly from the sides of the container 7 toward the closable drain 10. The system 1 further comprises a set of upper supports 11 coupled to the enclosure 3 and configured to support the container 7 in the upper position. The system 1 further comprises a connection member 12, such as a cable or rod, coupled at one end to the container 7 and configured to extend through the enclosure 3 for connection to an electrical generator 13 via the first axle 22.

The second closeable upper aperture 5, the closable lower outlet 6, and the closable drain 10 may be opened or closed using motors, magnets, pumps, springs, or other means for opening and closing known in the art. Similarly, the set of upper supports 11 may be extended or retracted using motors, magnets, pumps, springs, or other means for extending or retracting known in the art. In an alternative embodiment, the set of upper supports 11 may be pivoted using motors, magnets, pumps, springs, or other means for extending or retracting known in the art. The second closeable upper aperture 5, the closable lower outlet 6, the closable drain 10, and the set of upper supports 11 may be operatively connected to a controller, a computer processor, a local-area network, and/or a wide-area network (such as the Internet) for controlling the opening and closing of the aperture 5, outlet 6, and drain 10, and for controlling the extension and retraction of the supports 11.

In the embodiment shown in FIGS. 4 and 5, the enclosure 3 comprises an upper wall 14 in which the first upper aperture 4 and the second upper aperture 5 of the enclosure 3 are located, at least one sidewall 15 connected to the upper wall 14, and a lower wall 16 in which the lower outlet 6 of the enclosure 3 is located, the lower wall 16 being connected to the sidewall 15. The first upper aperture 4 of the enclosure 3 is located above the container 7 in a central portion of the upper wall 14. The second upper aperture 5 of the enclosure is located in a peripheral portion of the upper wall 14. The system 1 further comprises a vertical shaft 17 extending downwardly within the enclosure 3 from the second upper aperture 5 of the enclosure 3 toward the lower wall 16. The lower wall 16 of the enclosure 3 may be sloped downwardly toward the lower outlet 6 of the enclosure 3 to reduce sediment build-up within the enclosure 3.

The container 7 comprises a lower wall in which the drain 10 of the container 7 is located and a sidewall connected to the lower wall. The lower wall of the container may be sloped downwardly toward the drain 10 of the container 7 to reduce sediment build-up within the container 7. The drain 10 of the container 7 is vertically aligned with the lower outlet 6 of the enclosure 3 and is located in a central portion of the lower wall of the container 7. The drain 10 protrudes from the lower wall of the container 7 and is shaped to fit at least partially within the lower outlet 6 of the enclosure 3. The drain 10 may have a frustum or other suitable shape.

The set of upper supports 11 is retractable or pivotable so as to release the container 7 from the upper position. The system 1 further comprises a set of lower supports 18 coupled to the enclosure 3 and configured to support the container 7 in the lower position in order to allow water to partially surround the container 7 and cause the container 7 to float back up to the upper position.

The connection member 12 is configured to extend through the first upper aperture 4 of the enclosure 3 for connection to the electrical generator 13 via the first axle 22. The system 1 further comprises a pipe 19 coupled to the lower outlet 6 of the enclosure 3 and configured to drain water away from the enclosure 3. The pipe 19 extends downwardly from the lower outlet 6 of the enclosure 3, such that a discharge end 28 of the pipe 19 is lower than the lower outlet 6. As shown in FIGS. 1 and 3, the discharge end 28 is in air. While FIG. 3 shows most of the pipe 19 extending horizontally, in other embodiments the pipe may extend mostly or completely at angles below horizontal, may run along the bed of the body of water, and/or have portions that extend above horizontal to avoid obstacles.

In one embodiment, the outlet 6, the drain 10, and the pipe 19 all have a sufficiently large cross-sectional diameter to allow any aquatic life entering the enclosure 3 to escape unharmed. Additionally or alternatively, the first upper aperture 4 and/or the second closeable upper aperture 5 may be covered by a grating, grille, mesh, or netting to inhibit aquatic life from entering the enclosure 3.

In the embodiment shown in FIGS. 4 and 5, there are two upper apertures 4 and 5. In an alternative embodiment, instead of the enclosure 3 having two upper apertures, the enclosure 3 may have a one upper aperture and a valve configured to divert water flowing through the upper aperture either into the container 7 or outside of the container 7 into the enclosure 3.

In the embodiment shown in FIGS. 4 and 5, the system 1 further comprises a plug 20 having an inner conduit 21 aligned with the first upper aperture 4 of the enclosure 3 and extending from an upper end of the plug 20 to a lower end of the plug 20. The upper end of the plug 20 extends above the body of water 2 to allow air to flow through the inner conduit 21. The plug 20 is movable from an upper position in which the lower end of the plug 20 is located above the first upper aperture 4 of the enclosure 3 to allow water to flow through the first upper aperture 4, and a lower position in which the lower end of the plug 20 extends at least partially into the first upper aperture 4 of the enclosure 3 to allow air to flow through the first upper aperture 4 via the inner conduit 21 of the plug 20. The lower end of the plug 20 may have a frustum or other suitable shape. As shown in FIG. 5, the top of the plug 20 may always be above the surface of the water, even when the plug 20 is in the lower position, so that air can flow through the first upper aperture 4 via the inner conduit 21.

Referring back to FIGS. 1-3, the body of water 2 may continue to a waterfall 27 or other downstream water body that is at a lower elevation than the lower outlet 6 of the enclosure 3. The pipe 19 extends from the enclosure 3 to the waterfall 27 or other downstream water body, such that the discharge end 28 of the pipe 19 discharges water from the enclosure 3 into air (e.g., behind the waterfall 27, in front of the waterfall 27, or above the water level of the downstream water body).

In operation, when the container 7 is in the upper position within the enclosure 3 (shown in FIG. 4) and the enclosure is substantially empty of water, the drain 10 of the container 7 is closed and the first upper aperture 4 of the enclosure 3 allows water to flow from the body of water 2 into the container 7. When the container 7 is at least partially filled (and preferably completely or substantially completely filled) with water in the upper position, the set of upper supports 11 releases the container 7 from the upper position so that the container 7 may descend from the upper position to the lower position within the enclosure 3. Before the container 7 descends, the plug 20 is lowered into place within the first upper aperture 4 of the enclosure 3 so that water does not continue to enter the enclosure 3 and air is instead allowed to enter. When the container 7 descends from the upper position to the lower position within the enclosure 3, water stops flowing through the first upper aperture 4 from the body of water 2 into the container 7, and the container 7 pulls the connection member 12, causing the electrical generator 13 to generate electricity.

When the container 7 is in the lower position within the enclosure 3, the drain 10 of the container 7 may be opened to allow water to flow out of the container 7 and through the lower outlet 6 of the enclosure 3. After the container 7 is at least partially emptied of water in the lower position, the second upper aperture 5 of the enclosure 3 allows water to flow from the body of water 2 into the enclosure 3 outside of the container 7 while the first upper aperture 4 of the enclosure 3 allows air to escape from the enclosure 3 through the inner conduit 21 of the plug 20, causing the container 7 to ascend from the lower position to the upper position. After the container 7 ascends from the lower position to the upper position, the lower outlet 6 of the enclosure 3 opens to allow water in the enclosure 3 to drain out of the enclosure 3.

The plug 20 may be raised and lowered by rotation of the second axle 23 about its axis, which winds and unwinds the first plug cable 24 and the second plug cable 25 as needed to raise and lower the plug. The second axle 23 may be rotated using motors, magnets, pumps, springs, or other means for rotation known in the art. Additionally, the axle 23 may be operatively connected to a controller, a computer, processor, a local-area network, and/or a wide-area network (such as the Internet) for controlling the rotation of the second axle 23.

Figure 6:
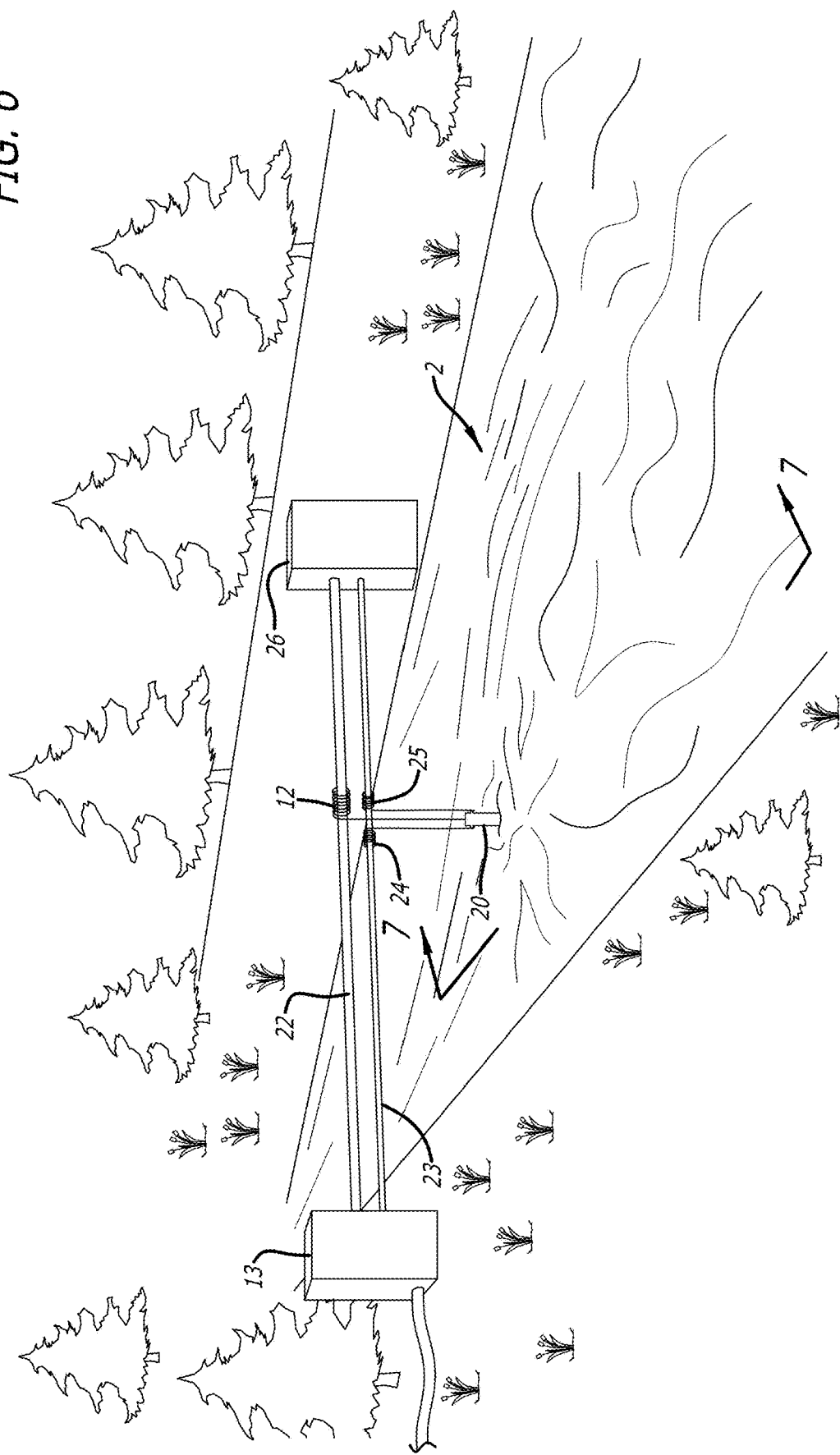
FIG. 6 is a perspective view of a system for generating electricity from a body of water, similar to the system of FIG. 1 but with the drainage pipe configured to empty into a downstream portion of the body of water, in accordance with one embodiment of the technology described herein.
Figure 7:
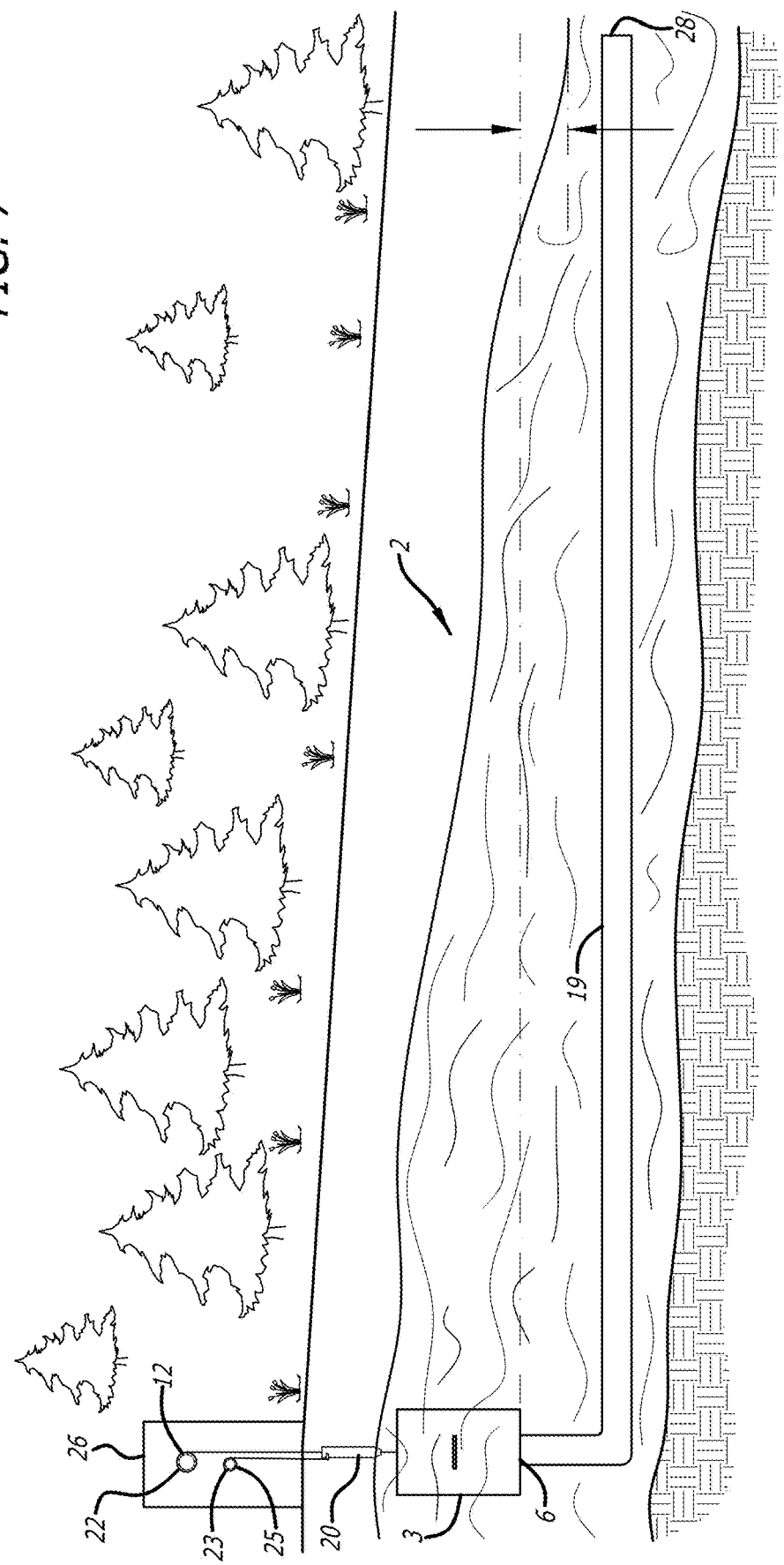
FIG. 7 is a cross-sectional, elevational view of the system of FIG. 6, taken along the line 7-7 in FIG. 6, in accordance with one embodiment of the technology described herein.

With reference to FIGS. 6 and 7, there is shown a system for generating electricity from a body of water 2, similar to the system of FIGS. 1-5 but with the pipe 19 configured to empty into a downstream portion of the body of water, which may be a flowing body of water such as a river or stream. The system may be configured in one embodiment to span the full body of water 2, with an electrical generator 13 on one side of the body of water 2. In other embodiments, the system may be configured to span a trench dug along one of the banks of the body of water 2 instead of spanning the full body of water 2.

As shown in FIGS. 6 and 7, the electrical generator 13 is rotatably attached to a first axle 22, around which a connection member 12 is tightly wound. The electrical generator 13 is also rotatably attached to a second axle 23, around which a first plug cable 24 and a second plug cable 25 are tightly wound. A second electrical generator 26 may be positioned on the other side of the body of water 2, opposite the electrical generator 13, and be rotatably attached to the first axle 22 and the second axle 23. In embodiments where the system spans a trench dug along one of the banks of the body of water 2, the second electrical generator 26 may be positioned on the other side of the trench from the electrical generator 13.

Electrical wires may extend from the electrical generator 13 and/or the electrical generator 26 to take electricity to the electrical grid (not shown). Electricity may be generated by rotation of the first axle 22 about its axis, accomplished by pulling of the connection member 12. The first axle may be biased, such as by a spring inside one or both of the electrical generators, so that when tension on the connection member 12 is released, the first axle reverses its rotation and re-winds the connection member 12. As shown in FIG. 6, the first axle 22 and the second axle 23 extend substantially perpendicular to the flow of water.

As shown in FIGS. 6 and 7, the system may further comprise an enclosure 3, a pipe 19, a plug 20, and other components, the details of which are described above with respect to FIGS. 4 and 5 and may be used with this configuration. Additionally, the plug 20 may be raised and lowered by rotation of the second axle 23 about its axis, which winds and unwinds the first plug cable 24 and the second plug cable 25 as needed to raise and lower the plug, as described above with respect to FIGS. 1-3.

As shown in FIGS. 6 and 7, the enclosure 3 is completely below the surface of the water. In various embodiments, the enclosure 3 may rest on the bottom of the body of water 2, be placed in a hole dug along the bed of the body of water 2, or be raised off of the bottom of the body of water 2.

FIGS. 6 and 7 show a single enclosure 3 positioned approximately halfway across the body of water 2. In other embodiments, multiple enclosures 3 may be positioned in or under the body of water 2 along the first axle 22 and the second axle 23. As shown in FIG. 7, the enclosure 3 may be positioned in a portion of the body of water 2 (left side of FIG. 7) that is upstream of another portion of the body of water at a lower elevation (right side of FIG. 7).

The system further comprises a pipe 19 coupled to the lower outlet 6 of the enclosure 3 and configured to drain water away from the enclosure 3. The pipe 19 extends downwardly from the lower outlet 6 of the enclosure 3, such that a discharge end 28 of the pipe 19 is lower than the lower outlet 6. As shown in FIG. 7, the discharge end 28 is in a downstream portion of the body of water 2. While FIG. 7 shows most of the pipe 19 extending horizontally, in other embodiments the pipe may extend mostly or completely at angles below horizontal, may run along the bed of the body of water, and/or have portions that extend above horizontal to avoid obstacles.

In the particular embodiment shown in FIG. 7, the enclosure 3 is positioned in a first portion of the body of water 2. The pipe 19 connects the closable lower outlet 6 of the enclosure 3 to a second portion of the body of water 2 that is downstream from the first portion of the body of water 2. The pipe 19 may remain fully underwater, including the discharge end 28. As shown by the arrows in FIG. 7, the second portion of the body of water 2 (where the discharge end 28 is) has a surface elevation that is lower than the elevation of the closable lower outlet 6 of the enclosure 3. This configuration allows water to drain from the enclosure 3 and inhibits water from backing up into the enclosure. The draining of the water through the discharge end 28 of the pipe 19 can be assisted by the flow of the water in the body of water 2, which tends to pull water out of the pipe 19 through the discharge end 28.

In one embodiment, the elevation of the closable lower outlet 6 of the enclosure 3 and the surface elevation of the body of water 2 at the discharge end 28 of the pipe 19 define an elevation band. The volume of the pipe 19 within this elevation band may be equal to or greater than the volume of the enclosure 3. In a particular embodiment, the volume of the pipe 19 within this elevation band may be equal to or greater than the volume of the enclosure 3 below the set of upper supports 11.

With reference to FIGS. 8-12, there is shown a system for generating electricity from a body of water 2, similar to the systems of FIGS. 1-7 but with the system spanning a trench dug along one of the banks of the body of water 2 instead of spanning the full body of water 2. The trench extends generally parallel to the main portion of the body of water 2 and carries water to the enclosure 3. In FIGS. 8-12, the pipe 19 is configured to empty into a downstream portion of the body of water, which may be a flowing body of water such as a river or stream.

Figure 8:
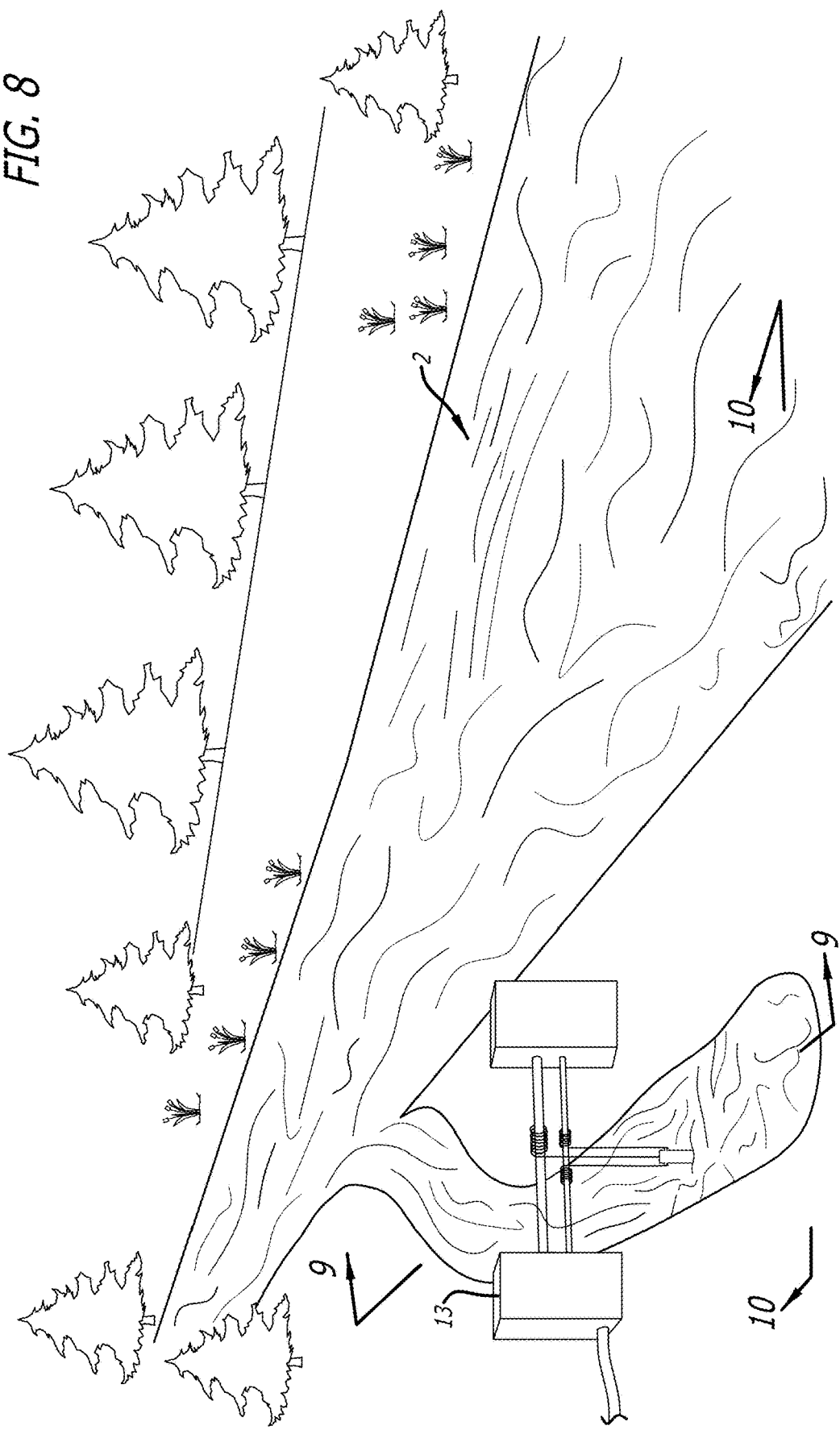
FIG. 8 is a perspective view of a system for generating electricity from a body of water, similar to the systems of FIGS. 1 and 6, but with the system spanning a trench dug along one of the banks of the body of water instead of spanning the full body of water, in accordance with one embodiment of the technology described herein.
Figure 9:
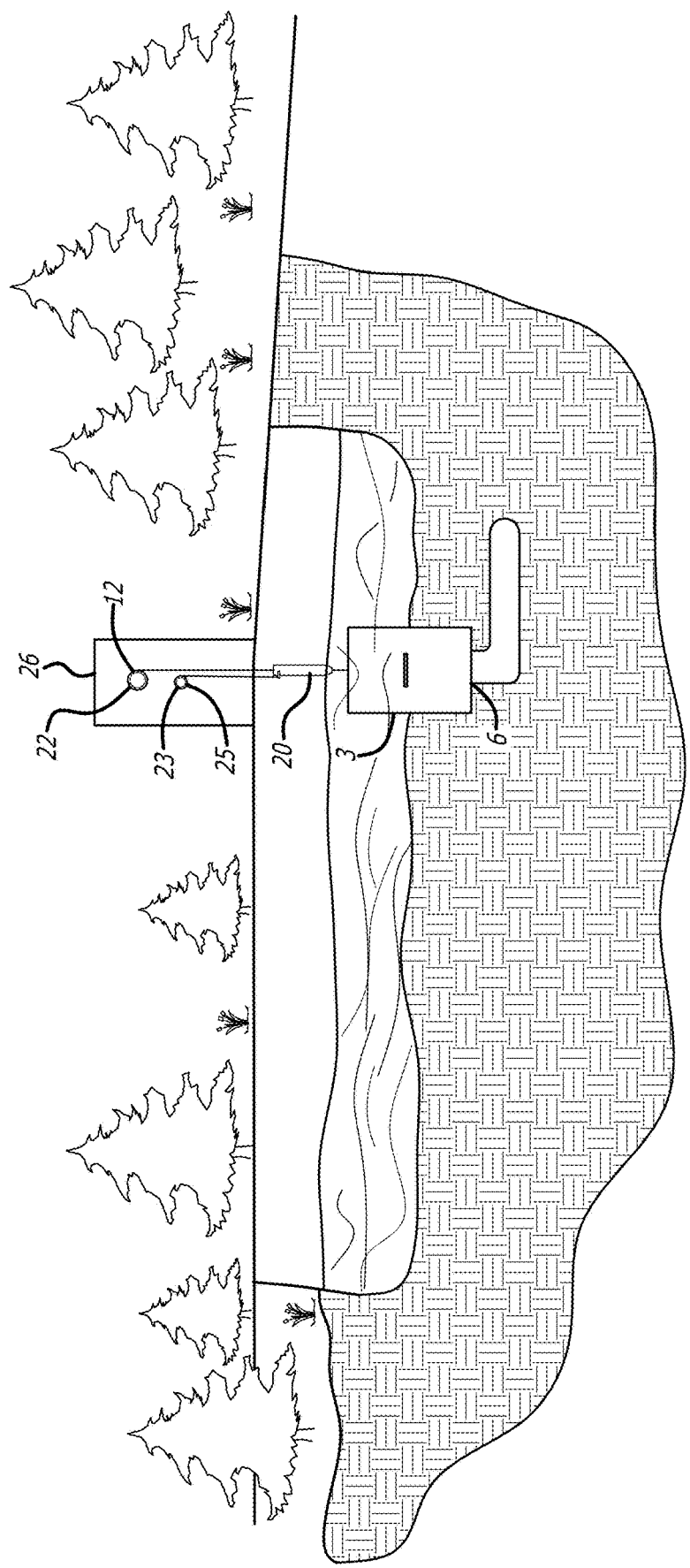
FIG. 9 is a cross-sectional, elevational view of the system of FIG. 8, taken along the line 9-9 in FIG. 8, in accordance with one embodiment of the technology described herein.
Figure 10:
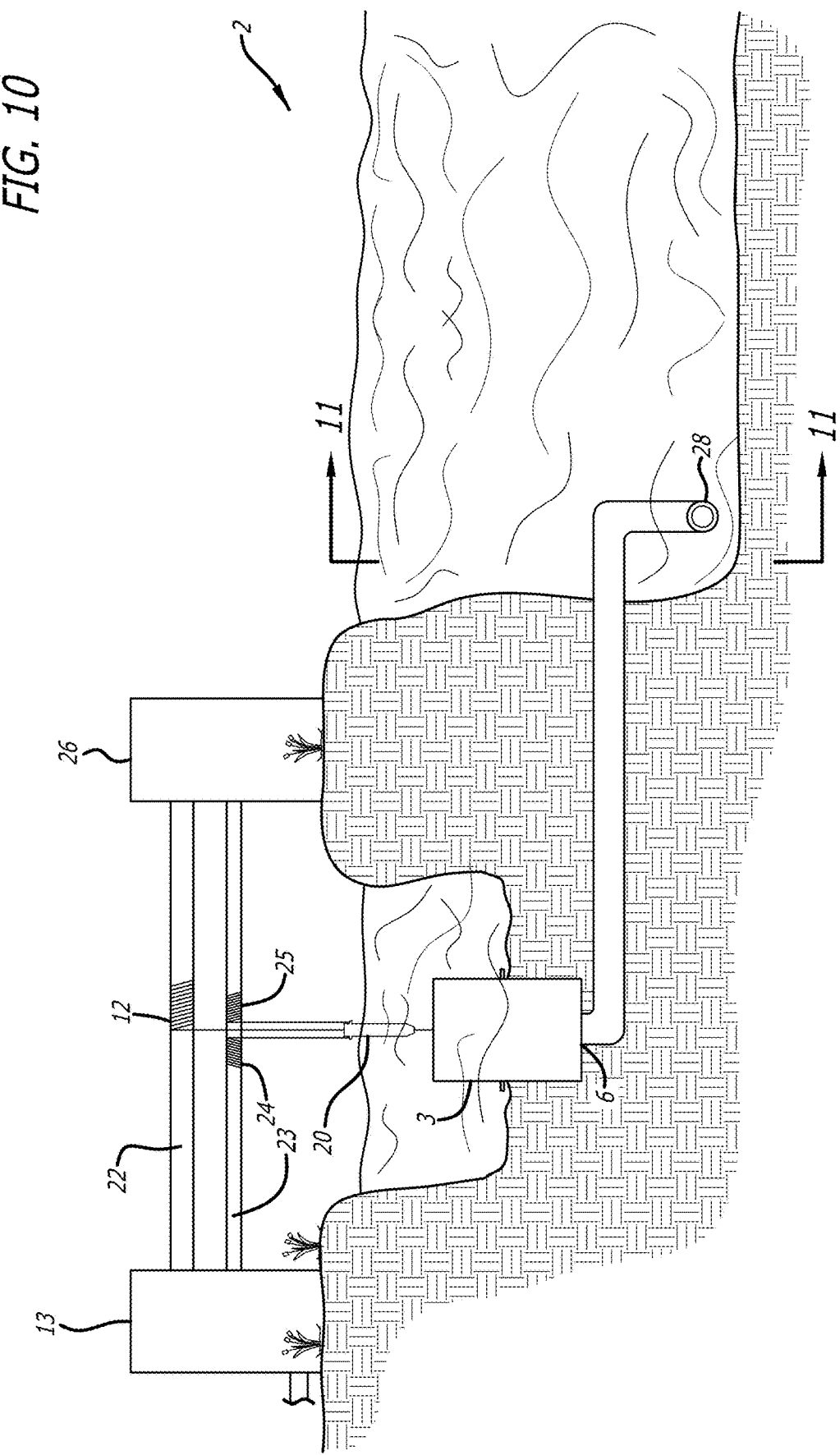
FIG. 10 is a cross-sectional, elevational view of the system of FIG. 8, taken along the line 10-10 in FIG. 8, in accordance with one embodiment of the technology described herein.

As shown in FIGS. 8-10, the electrical generator 13 is rotatably attached to a first axle 22, around which a connection member 12 is tightly wound. The electrical generator 13 is also rotatably attached to a second axle 23, around which a first plug cable 24 and a second plug cable 25 are tightly wound. A second electrical generator 26 may be positioned on the other side of the trench, opposite the electrical generator 13, and be rotatably attached to the first axle 22 and the second axle 23.

Electrical wires may extend from the electrical generator 13 and/or the electrical generator 26 to take electricity to the electrical grid (not shown). Electricity may be generated by rotation of the first axle 22 about its axis, accomplished by pulling of the connection member 12. The first axle may be biased, such as by a spring inside one or both of the electrical generators, so that when tension on the connection member 12 is released, the first axle reverses its rotation and re-winds the connection member 12. As shown in FIGS. 8-10, the first axle 22 and the second axle 23 extend substantially perpendicular to the flow of water in the trench.

As shown in FIGS. 9-12, the system may further comprise an enclosure 3, a pipe 19, a plug 20, and other components, the details of which are described above with respect to FIGS. 4 and 5 and may be used with this configuration. Additionally, the plug 20 may be raised and lowered by rotation of the second axle 23 about its axis, which winds and unwinds the first plug cable 24 and the second plug cable 25 as needed to raise and lower the plug, as described above with respect to FIGS. 1-3.

As shown in FIGS. 8-12, the enclosure 3 is completely below the surface of the water. In various embodiments, the enclosure 3 may rest on the bottom of the body of water 2, be placed in a hole dug along the bed of the body of water 2, or be raised off of the bottom of the body of water 2.

Figure 11:
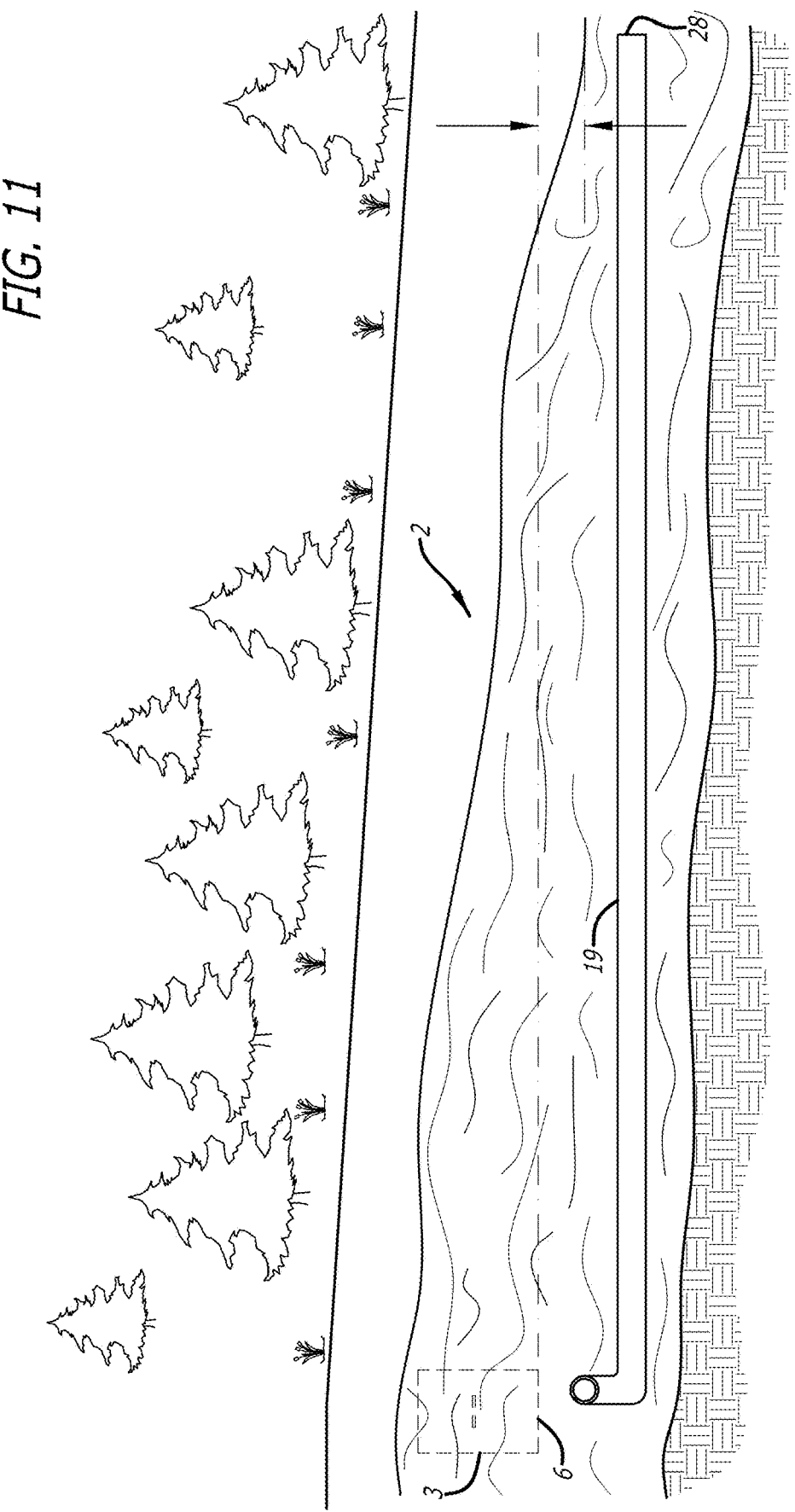
FIG. 11 is a cross-sectional, elevational view of the system of FIG. 8, taken along the line 11-11 in FIG. 10, in accordance with one embodiment of the technology described herein.
Figure 12:
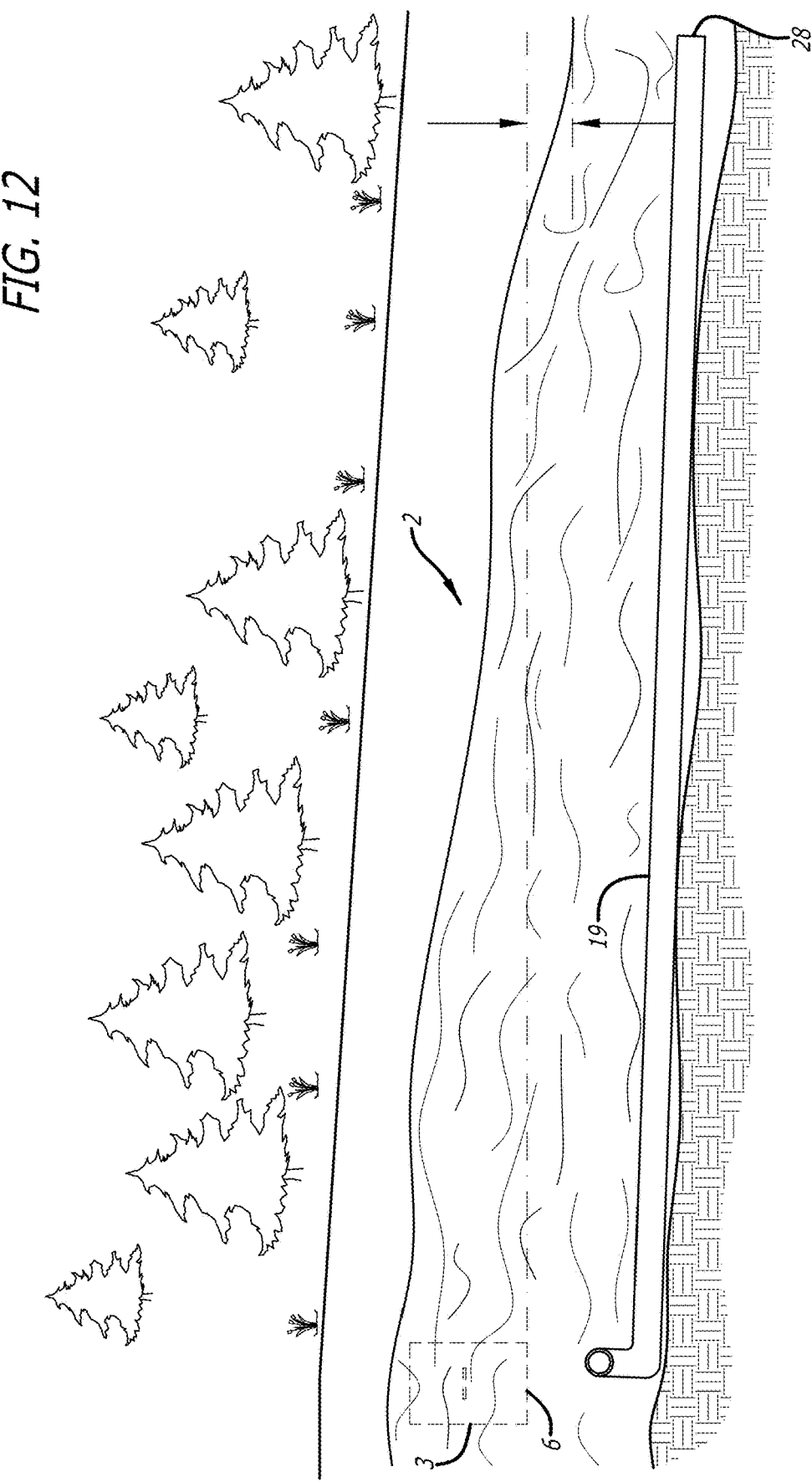
FIG. 12 is a cross-sectional, elevational view of the system of FIG. 8, taken along the line 11-11 in FIG. 10, but with the drainage pipe running along the top of the bed of the body of water, in accordance with one embodiment of the technology described herein.

FIGS. 8-10 show a single enclosure 3 positioned approximately halfway across the trench. In other embodiments, multiple enclosures 3 may be positioned in or under the trench along the first axle 22 and the second axle 23. As shown in FIGS. 11 and 12, the enclosure 3 may be positioned in a portion of the body of water 2 (the trench) that is upstream of another portion of the body of water at a lower elevation (right side of FIGS. 11 and 12).

The system further comprises a pipe 19 coupled to the lower outlet 6 of the enclosure 3 and configured to drain water away from the enclosure 3. The pipe 19 extends downwardly from the lower outlet 6 of the enclosure 3, such that a discharge end 28 of the pipe 19 is lower than the lower outlet 6. As shown in FIGS. 11 and 12, the discharge end 28 is in a downstream portion of the body of water 2. In the embodiment shown in FIG. 11, most of the pipe 19 extends horizontally. In an alternative embodiment as shown in FIG. 12, the pipe extends at an angle below horizontal and, in particular, along the bed of the body of water. In other embodiments, the pipe 19 may have portions that extend above horizontal to avoid obstacles.

In the embodiments shown in FIGS. 8-12, the enclosure 3 is positioned in a first portion of the body of water 2, specifically the trench dug along one of the banks of the body of water 2. The pipe 19 connects the closable lower outlet 6 of the enclosure 3 to a second portion of the body of water 2 that is downstream from the trench. The pipe 19 may remain fully underwater, including the discharge end 28, except for the portion that extends in the ground from the closable lower outlet 6 as shown in FIGS. 9 and 10. As shown by the arrows in FIGS. 11 and 12, the second portion of the body of water 2 (where the discharge end 28 is) has a surface elevation that is lower than the elevation of the closable lower outlet 6 of the enclosure 3. This configuration allows water to drain from the enclosure 3 and inhibits water from backing up into the enclosure. The draining of the water through the discharge end 28 of the pipe 19 can be assisted by the flow of the water in the body of water 2, which tends to pull water out of the pipe 19 through the discharge end 28.

In one embodiment, the elevation of the closable lower outlet 6 of the enclosure 3 and the surface elevation of the body of water 2 at the discharge end 28 of the pipe 19 define an elevation band. The volume of the pipe 19 within this elevation band may be equal to or greater than the volume of the enclosure 3. In a particular embodiment, the volume of the pipe 19 within this elevation band may be equal to or greater than the volume of the enclosure 3 below the set of upper supports 11.

Figure 13A:
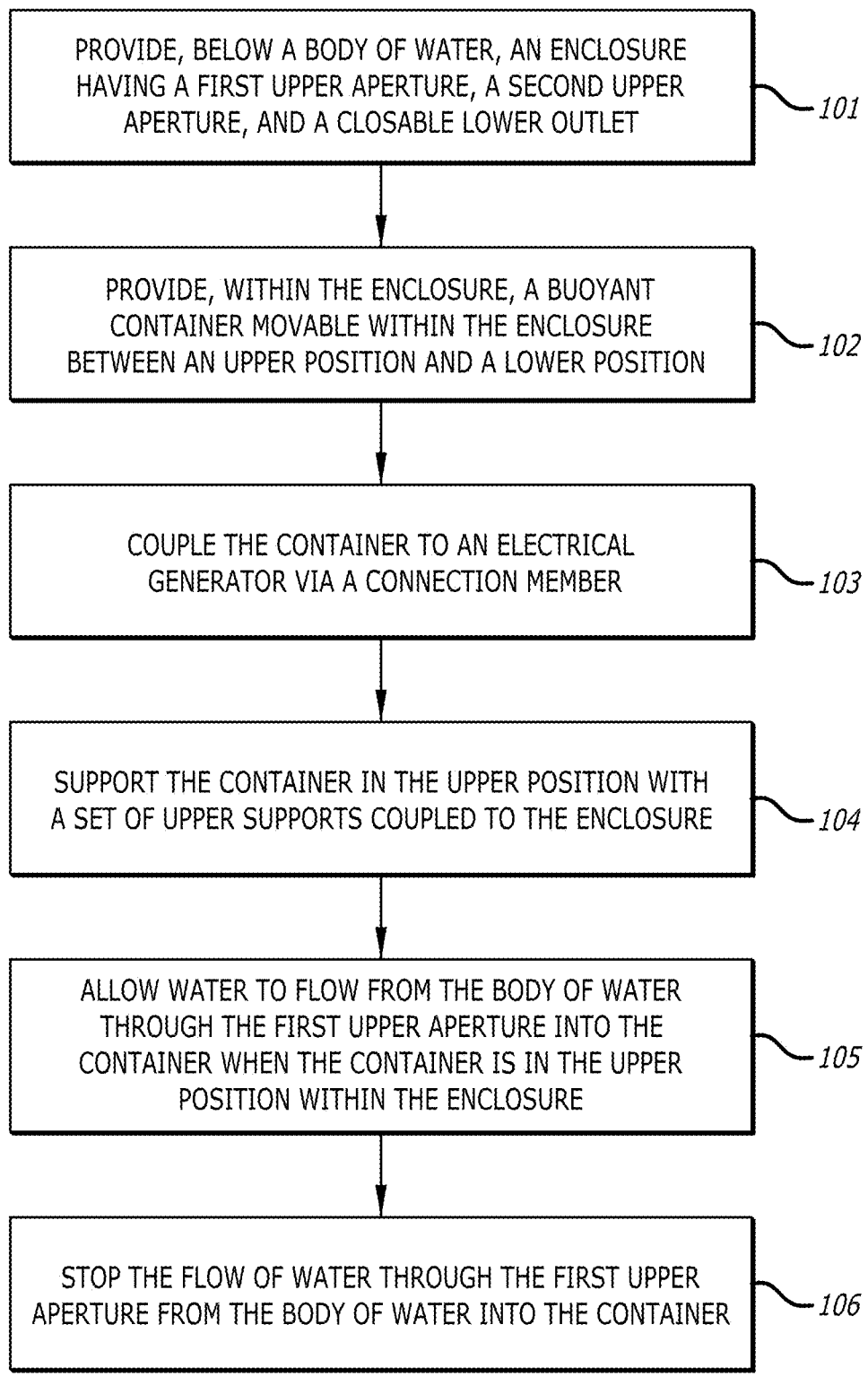
FIGS. 13A and 13B show a method for generating electricity from a body of water in accordance with one embodiment of the technology described herein.
Figure 13B:
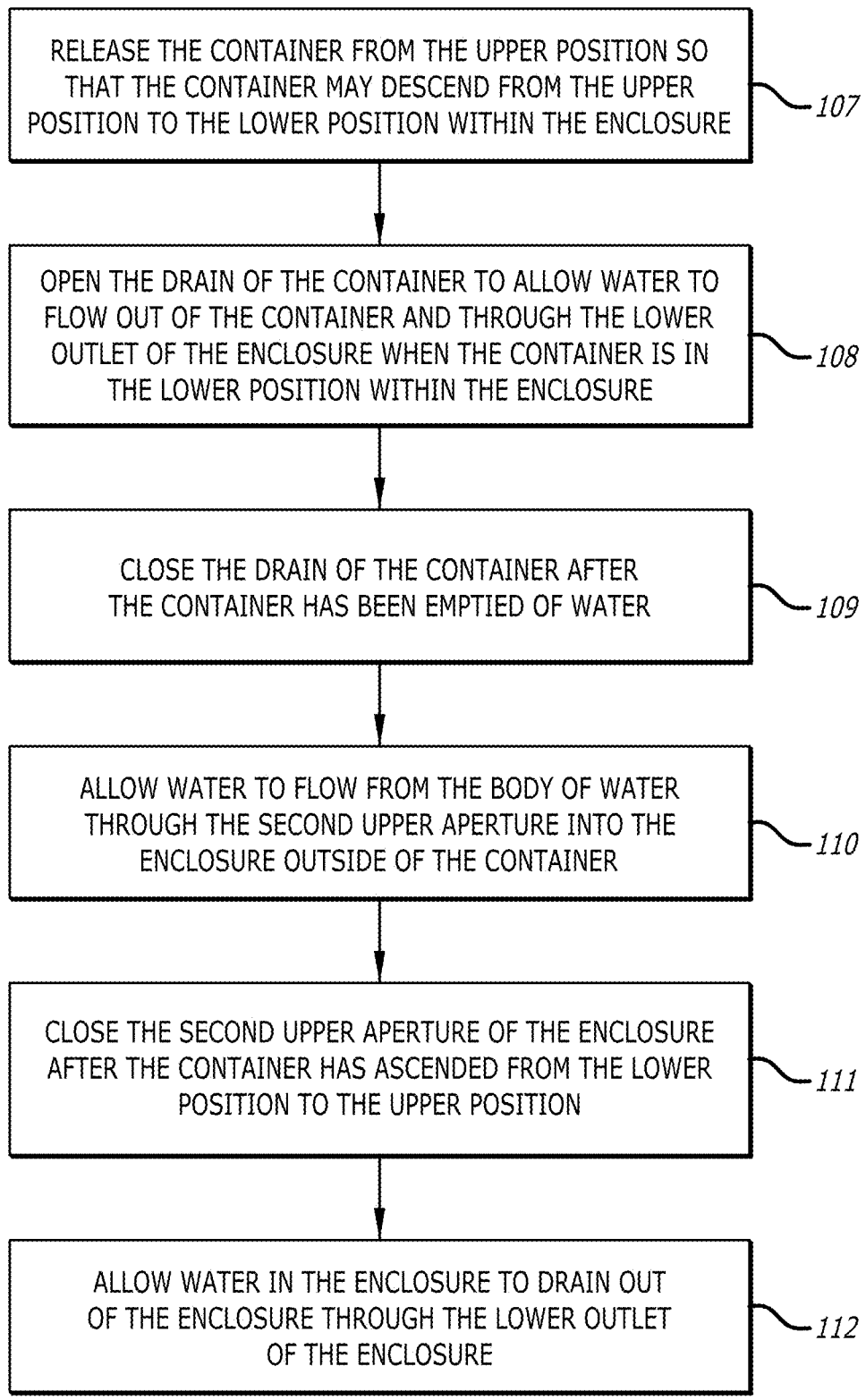

With reference to FIGS. 13A and 13B, there is shown a method 100 for generating electricity from the body of water 2 using the system 1 of FIGS. 1-5. The method 100 comprises a step 101 of providing, below the body of water 2, the enclosure 3 having the first upper aperture 4, the second upper aperture 5, and the closable lower outlet 6, with the pipe 19 coupled to the lower outlet 6 of the enclosure 3 and having the discharge end 28 configured to discharge water from the enclosure 3 into air (e.g., above the water level of a downstream water body). The method 100 further comprises a step 102 of providing, within the enclosure 3, the buoyant container 7 movable within the enclosure 3 between an upper position and a lower position, the container 7 having the upper end 8 that is at least partially open and the lower end 9 having the closable drain 10.

In step 103, the container 7 is coupled to the electrical generator 13 via the connection member 12, such as a cable or rod. In step 104, while the enclosure 3 is substantially empty of water, the container 7 is supported in the upper position with the set of upper supports 11 coupled to the enclosure 3. In step 105, water is allowed to flow from the body of water 2 through the first upper aperture 4 into the container 7 when the container 7 is in the upper position within the enclosure 3 and the drain 10 of the container 7 is closed.

In one embodiment, the method 100 further comprises a step 106 of stopping the flow of water through the first upper aperture 4 from the body of water 2 into the container 7 before the water overflows from the container 7 into the rest of the enclosure 3. Step 106 may comprise lowering the plug 20 into place within the first upper aperture 4 so that water does not continue to enter the enclosure 3.

In step 107, the container 7 is released from the upper position so that the container 7 may descend from the upper position to the lower position within the otherwise empty enclosure 3 when the container 7 is at least partially filled (and preferably substantially or completely filled) with water in the upper position. Step 107 may comprise retracting the upper supports 11.

In step 108, the drain 10 of the container 7 is opened to allow water to flow out of the container 7 and through the lower outlet 6 of the enclosure 3 when the container 7 is in the lower position within the enclosure 3. As described above, the pipe 19 is coupled to the lower outlet 6 of the enclosure 3 and has its discharge end 28 configured to discharge water from the enclosure 3 into air (e.g., above the water level of a downstream water body). In step 109, after the container 7 has been emptied of water, the drain 10 of the container 7 is closed.

In step 110, water is allowed to flow from the body of water 2 through the second upper aperture 5 into the enclosure 3 outside of the container 7 after the container 7 is at least partially emptied of water in the lower position. The water is allowed to partially surround the container 7.

In one embodiment, step 110 further comprises allowing air to escape from the enclosure 3 through the first upper aperture 4 when the second upper aperture 5 of the enclosure 3 allows water to flow from the body of water 2 into the enclosure 3. In step 110, the air may escape from the enclosure 3 through the inner conduit 21 of the plug 20. As part of step 110, the container 7 is allowed to ascend from the lower position to the upper position as water flows into the enclosure 3 outside of the container 7.

In one embodiment, the method 100 further comprises a step 111 of closing the second upper aperture 5 of the enclosure 3 after the container 7 has ascended from the lower position to the upper position. In step 112, the container 7 is again supported in the upper position with the set of upper supports 11 coupled to the enclosure 3, and water in the enclosure 3 is allowed to drain out of the enclosure 3 through the lower outlet 6 of the enclosure 3. The process may then return to step 105.

It should be understood that the various features, aspects, and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described example embodiments.

While the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method and illustrative examples shown and described. Accordingly, departures may be made from such details without departing from the general inventive concept.

What is claimed is:

1. A system for generating electricity from a body of water, the system comprising:
   an enclosure positioned in or under a first portion of the body of water and having a first upper aperture, a second upper aperture, and a closable lower outlet;
   a pipe connecting the closable lower outlet of the enclosure to a second portion of the body of water downstream from the first portion of the body of water, the second portion having a surface elevation lower than an elevation of the closable lower outlet of the enclosure;
   a buoyant container movable within the enclosure between an upper position and a lower position, the container having an upper end that is at least partially open and a lower end having a closable drain;
   a set of upper supports coupled to the enclosure and configured to support the container in the upper position; and
   a connection member coupled at one end to the container and configured to extend through the enclosure for operative connection to an electrical generator;
   wherein, when the container is in the upper position within the enclosure and the enclosure is substantially empty of water, the drain of the container is closed and the first upper aperture of the enclosure allows water to flow from the body of water into the container;
   wherein, when the container is at least partially filled with water in the upper position, the set of upper supports releases the container from the upper position so that the container may descend from the upper position to the lower position within the enclosure;
   wherein, when the container is in the lower position within the enclosure, the drain of the container is opened to allow water to flow out of the container and through the lower outlet of the enclosure; and
   wherein, after the container is at least partially emptied of water in the lower position, the second upper aperture of the enclosure allows water to flow from the body of water into the enclosure outside of the container, causing the container to ascend from the lower position to the upper position.

2. The system of claim 1, wherein the enclosure comprises:
   an upper wall in which the first upper aperture and the second upper aperture of the enclosure are located;
   at least one sidewall connected to the upper wall; and
   a lower wall in which the lower outlet of the enclosure is located, the lower wall being connected to the sidewall.

3. The system of claim 2, wherein:
   the first upper aperture of the enclosure is located above the container in a central portion of the upper wall; and
   the second upper aperture of the enclosure is located in a peripheral portion of the upper wall.

4. The system of claim 3, further comprising a vertical shaft extending downwardly within the enclosure from the second upper aperture of the enclosure toward the lower wall.

5. The system of claim 1, wherein the container comprises:
   a lower wall in which the drain of the container is located; and
   a sidewall connected to the lower wall.

6. The system of claim 5, wherein the lower wall of the container is sloped downwardly toward the drain of the container to reduce sediment build-up within the container.

7. The system of claim 5, wherein the drain of the container is vertically aligned with the lower outlet of the enclosure.

8. The system of claim 7, wherein the drain protrudes from the lower wall of the container and is shaped to fit at least partially within the lower outlet of the enclosure.

9. The system of claim 1, wherein the set of upper supports is retractable so as to release the container from the upper position.

10. The system of claim 1, further comprising a set of lower supports coupled to the enclosure and configured to support the container in the lower position.

11. The system of claim 1, wherein the connection member is configured to extend through the first upper aperture of the enclosure for operative connection to the electrical generator.

12. The system of claim 1, wherein, when the container descends from the upper position to the lower position within the enclosure, water stops flowing through the first upper aperture from the body of water into the container.

13. The system of claim 1, wherein, when the container descends from the upper position to the lower position within the enclosure, the container pulls the connection member, causing the electrical generator to generate electricity.

14. The system of claim 1, wherein, when the second upper aperture of the enclosure allows water to flow from the body of water into the enclosure, the first upper aperture of the enclosure allows air to escape from the enclosure.

15. The system of claim 1, wherein, after the container ascends from the lower position to the upper position, the lower outlet of the enclosure opens to allow water in the enclosure to drain out of the enclosure.

16. The system of claim 1, further comprising the electrical generator.

17. The system of claim 1, wherein the pipe is configured to drain water away from the enclosure.

18. The system of claim 1, further comprising a plug having an inner conduit aligned with the first upper aperture of the enclosure and extending from an upper end of the plug to a lower end of the plug;
wherein the upper end of the plug extends above the body of water to allow air to flow through the inner conduit;
wherein the plug is movable from an upper position in which the lower end of the plug is located above the first upper aperture of the enclosure to allow water to flow through the first upper aperture, and a lower position in which the lower end of the plug extends at least partially into the first upper aperture of the enclosure to allow air to flow through the first upper aperture via the inner conduit of the plug.

19. A method for generating electricity from a body of water, the method comprising:
providing, in or below a first portion of a body of water, an enclosure having a first upper aperture, a second upper aperture, and a closable lower outlet;
connecting, via a pipe, the closable lower outlet of the enclosure to a second portion of the body of water downstream from the first portion of the body of water, the second portion having a surface elevation lower than an elevation of the closable lower outlet of the enclosure;
providing, within the enclosure, a buoyant container movable within the enclosure between an upper position and a lower position, the container having an upper end that is at least partially open and a lower end having a closable drain, the container being operatively coupled to an electrical generator via a connection member;
supporting the container in the upper position with a set of upper supports coupled to the enclosure while the enclosure is substantially empty of water;
allowing water to flow from the body of water through the first upper aperture into the container when the container is in the upper position within the enclosure and the drain of the container is closed;
releasing the container from the upper position so that the container may descend from the upper position to the lower position within the enclosure when the container is at least partially filled with water in the upper position;
opening the drain of the container to allow water to flow out of the container and through the lower outlet of the enclosure when the container is in the lower position within the enclosure; and
allowing water to flow from the body of water through the second upper aperture into the enclosure outside of the container after the container is at least partially emptied of water in the lower position, causing the container to ascend from the lower position to the upper position.

20. A system for generating electricity from a body of water, the system comprising:
an enclosure positioned in or under a first portion of the body of water and having a first upper aperture, a second upper aperture, and a closable lower outlet, the enclosure comprising
an upper wall in which the first upper aperture and the second upper aperture of the enclosure are located, the first upper aperture of the enclosure being located above the container in a central portion of the upper wall of the enclosure,
at least one sidewall connected to the upper wall of the enclosure, and
a lower wall in which the lower outlet of the enclosure is located, the lower wall of the enclosure being connected to the sidewall of the enclosure and the second upper aperture of the enclosure being located in a peripheral portion of the upper wall of the enclosure;
a vertical shaft extending downwardly within the enclosure from the second upper aperture of the enclosure toward the lower wall of the enclosure;
a buoyant container movable within the enclosure between an upper position and a lower position, the container having an upper end that is at least partially open and a lower end having a closable drain, the container comprising
a lower wall in which the drain of the container is located, the lower wall of the container being sloped downwardly toward the drain of the container to reduce sediment build-up within the container, the drain of the container being vertically aligned with the lower outlet of the enclosure, the drain protruding from the lower wall of the container and shaped to fit at least partially within the lower outlet of the enclosure, and
a sidewall connected to the lower wall of the container;
a set of upper supports coupled to the enclosure and configured to support the container in the upper position;

a set of lower supports coupled to the enclosure and configured to support the container in the lower position;

a cable coupled at one end to the container and configured to extend through the enclosure for operative connection to an electrical generator, the cable being configured to extend through the first upper aperture of the enclosure for operative connection to the electrical generator;

a pipe coupled to the lower outlet of the enclosure and configured to drain water away from the enclosure, a discharge end of the pipe being in a second portion of the body of water downstream from the first portion of the body of water, the second portion having a surface elevation lower than an elevation of the lower outlet of the enclosure; and a plug having an inner conduit aligned with the first upper aperture of the enclosure and extending from an upper end of the plug to a lower end of the plug, the upper end of the plug extending above the body of water to allow air to flow through the inner conduit;

wherein, when the container is in the upper position within the enclosure and the enclosure is substantially empty of water, the drain of the container is closed and the first upper aperture of the enclosure allows water to flow from the body of water into the container;

wherein, when the container is at least partially filled with water in the upper position, the plug descends into the first upper aperture of the enclosure and the set of upper supports releases the container from the upper position so that the container may descend from the upper position to the lower position within the enclosure;

wherein, when the container descends from the upper position to the lower position within the enclosure, water stops flowing through the first upper aperture from the body of water into the container, and the container pulls the cable, causing the electrical generator to generate electricity;

wherein, when the container is in the lower position within the enclosure, the drain of the container is opened to allow water to flow out of the container and through the lower outlet of the enclosure;

wherein, after the container is at least partially emptied of water in the lower position, the second upper aperture of the enclosure allows water to flow from the body of water into the enclosure outside of the container while the first upper aperture of the enclosure allows air to escape from the enclosure through the inner conduit of the plug, causing the container to ascend from the lower position to the upper position;

wherein, after the container ascends from the lower position to the upper position, the lower outlet of the enclosure opens to allow water in the enclosure to drain out of the enclosure; and wherein the plug is movable from an upper position in which the lower end of the plug is located above the first upper aperture of the enclosure to allow water to flow through the first upper aperture, and a lower position in which the lower end of the plug extends at least partially into the first upper aperture of the enclosure to allow air to flow through the first upper aperture via the inner conduit of the plug.

* * * * *